United States Patent [19]
Proefke et al.

[11] Patent Number: 5,396,217
[45] Date of Patent: Mar. 7, 1995

[54] PHASE SHIFT ANALYSIS FOR VEHICLE INTRUSION DETECTION

[75] Inventors: David T. Proefke, Madison Heights; Richard D. Eaton, Rochester, both of Mich.; Frank B. Wiloch, Russiaville, Ind.; John R. Bolhuis, Utica, Mich.

[73] Assignee: General Motors Corporation, Detroit, Mich.

[21] Appl. No.: 11,607

[22] Filed: Feb. 1, 1993

[51] Int. Cl.6 .............................................. G08B 13/16
[52] U.S. Cl. ..................... 340/426; 340/552; 340/553; 340/554; 367/93; 367/94
[58] Field of Search ............... 340/426, 554, 553, 552; 367/93, 94

[56] References Cited

U.S. PATENT DOCUMENTS

| | | | |
|---|---|---|---|
| 3,681,745 | 8/1972 | Perlman et al. | 367/94 |
| 4,638,294 | 1/1987 | Sakurai | 340/426 |
| 4,866,417 | 9/1989 | DeFino et al. | 340/429 |
| 5,049,858 | 9/1991 | Price | 340/552 |
| 5,077,548 | 12/1991 | Dipoala | 340/522 |
| 5,079,538 | 1/1992 | DeFino et al. | 340/426 |

Primary Examiner—Glen Swann
Attorney, Agent, or Firm—Michael J. Bridges

[57] ABSTRACT

Intrusion into an automotive vehicle interior is detected by passing an airborne acoustic signal through a portion of the vehicle interior when the vehicle security system is active, and by measuring any change in phase in the signal as it passes through the vehicle. The phase of a first frequency component in the signal is sensitive to intrusion into the vehicle, and the phase of a second frequency component is sensitive to false alarm conditions, but is not sensitive to intrusion.

9 Claims, 5 Drawing Sheets

PHASE SHIFT ANALYSIS FOR VEHICLE INTRUSION DETECTION

The present invention relates to automotive vehicle security systems and, more specifically, to a system for detecting and indicating intrusion into the passenger compartment of an automotive vehicle.

BACKGROUND OF THE INVENTION

An overwhelming number of vehicle thefts involve penetration into the passenger compartment of the vehicle. Systems are available generally that when armed, detect the opening of vehicle doors, hood or trunklid, such as by monitoring switches actuated upon such opening occurrences. Systems are also generally available that when armed, detect bumping or jarring of the vehicle, such as may be incidental to forced penetration into the vehicle. However, these systems do not detect all forms of penetration into the passenger compartment, such as those not accompanied by the opening of doors or by bumping or jarring of the vehicle. A system has been proposed in U.S. Pat. No. 4,638,294 to detect intrusion by propagating an electromagnetic wave through the vehicle interior and monitoring the amplitude of the received wave which may change upon intrusion into the vehicle. However, such a system requires additional expense of adding sophisticated electromagnetic transmitting and receiving means into the vehicle. Accordingly, what is needed is a comprehensive vehicle intrusion detection system that may be provided at minimal cost.

SUMMARY OF THE INVENTION

The present invention overcomes the disadvantages of the prior art systems by providing a comprehensive vehicle intrusion detector that uses simple and inexpensive parts, some of which may already be present on many automotive vehicles. Specifically, the present invention provides a security system for vehicles that, when armed, periodically propagates an acoustic wave of a predetermined frequency through the interior of the vehicle using a conventional audio speaker. The wave is received in the vehicle interior via a conventional audio microphone and the phase shift between the transmitted and received signals is simply determined. If the vehicle is even momentarily opened, such as by any intrusion, the phase shift will deviate measurably from a calibrated closed vehicle phase shift. Accordingly, if the phase shift of the signal exceeds a shift threshold calibrated for the vehicle being monitored, an intrusion is detected.

A further aspect of the invention provides that a second wave at a second frequency may be propagated through the vehicle at the time the first is propagated, wherein the second frequency is calibrated as one having an insignificant phase shift when an intrusion takes place, but having a significant phase shift under certain false alarm conditions, such as non-intrusion conditions that nonetheless produce a significant phase shift in the first frequency. The phase shift of both frequencies are measured, and an intrusion detected when a significant phase shift is detected in the first frequency and no significant phase shift is detected in the second frequency.

A further aspect of the invention significantly reduces the power requirements of the system, which necessarily operates when the vehicle is off. This is provided by only periodically measuring phase shift, such as after a predetermined period of time has elapsed since the past measurement, after the vehicle has been bumped or jarred, or after the microphone transduces a significant change in noise within the vehicle.

BRIEF DESCRIPTION OF THE DRAWINGS

The invention may be best understood by reference to the following description of a preferred embodiment and to the drawings in which.

DESCRIPTION OF THE PREFERRED EMBODIMENT

Figure 1:
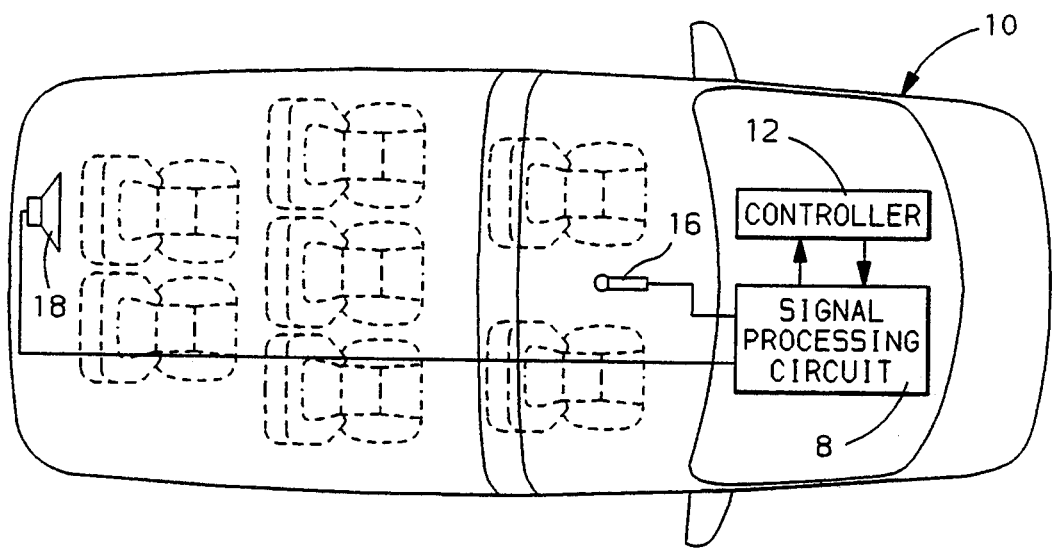
FIG. 1 is a general diagram of components of an intrusion detection system installed in an automotive vehicle in accord with a preferred embodiment of this invention.

Referring to FIG. 1, an automotive vehicle 10 is shown, having a rear mounted conventional speaker 18, and a forward mounted conventional microphone 16, both of which are connected to signal processing circuit 8, which communicates with controller 12. Signal processing circuit 8 is detailed in FIGS. 2a and 2b. The speaker 18 may be a generally known high performance speaker having good low frequency response characteristics, and the microphone 16 may be any known microphone capable of transducing sound waves in the acoustic range to representative electrical signals, such as Electret Omnidirectional Microphone, Model No. 270-090. The signal driving the speaker 18 is provided by the signal processing circuit 8 in a manner to be detailed, and the transduced microphone signal is provided to the circuit 8, where appropriate information is extracted from the signal and is communicated to controller 12, as will be described.

Figure 2B:
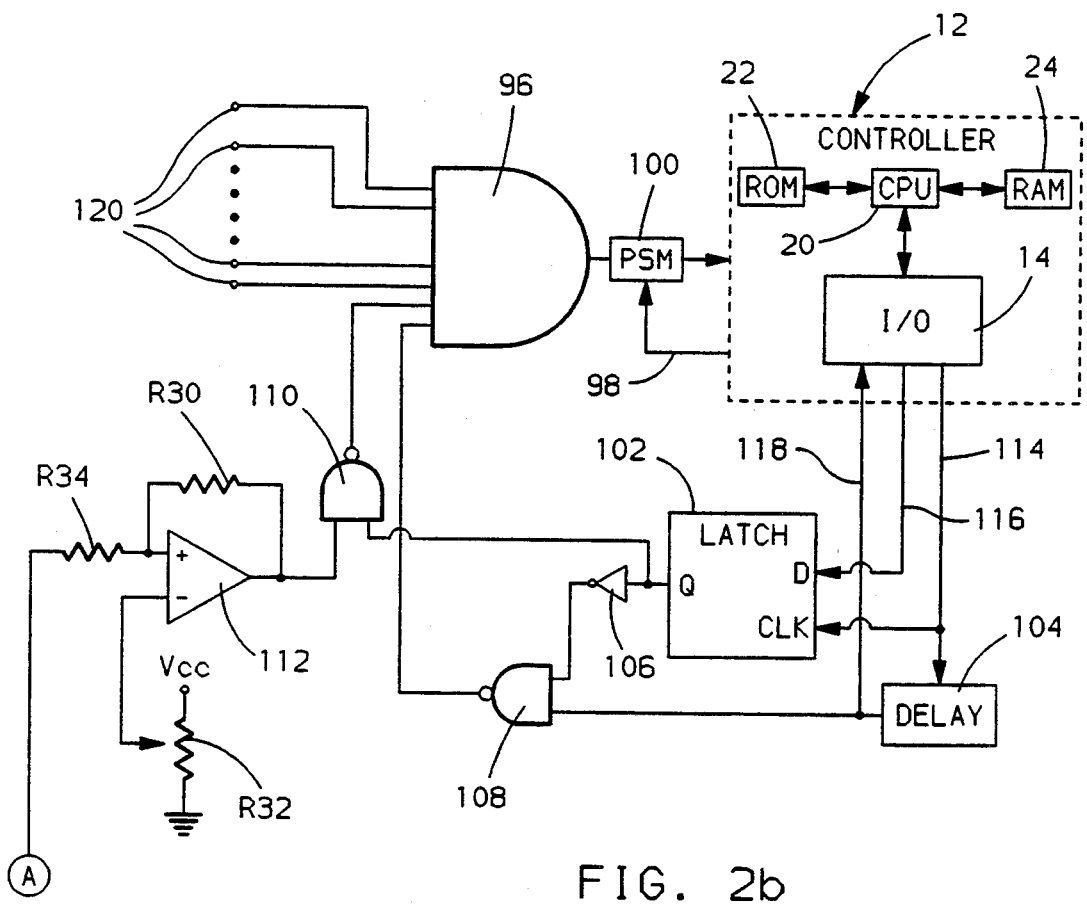
FIG. 2b is a diagram of circuitry used to activate the intrusion detection system of this embodiment.
Figure 2A:
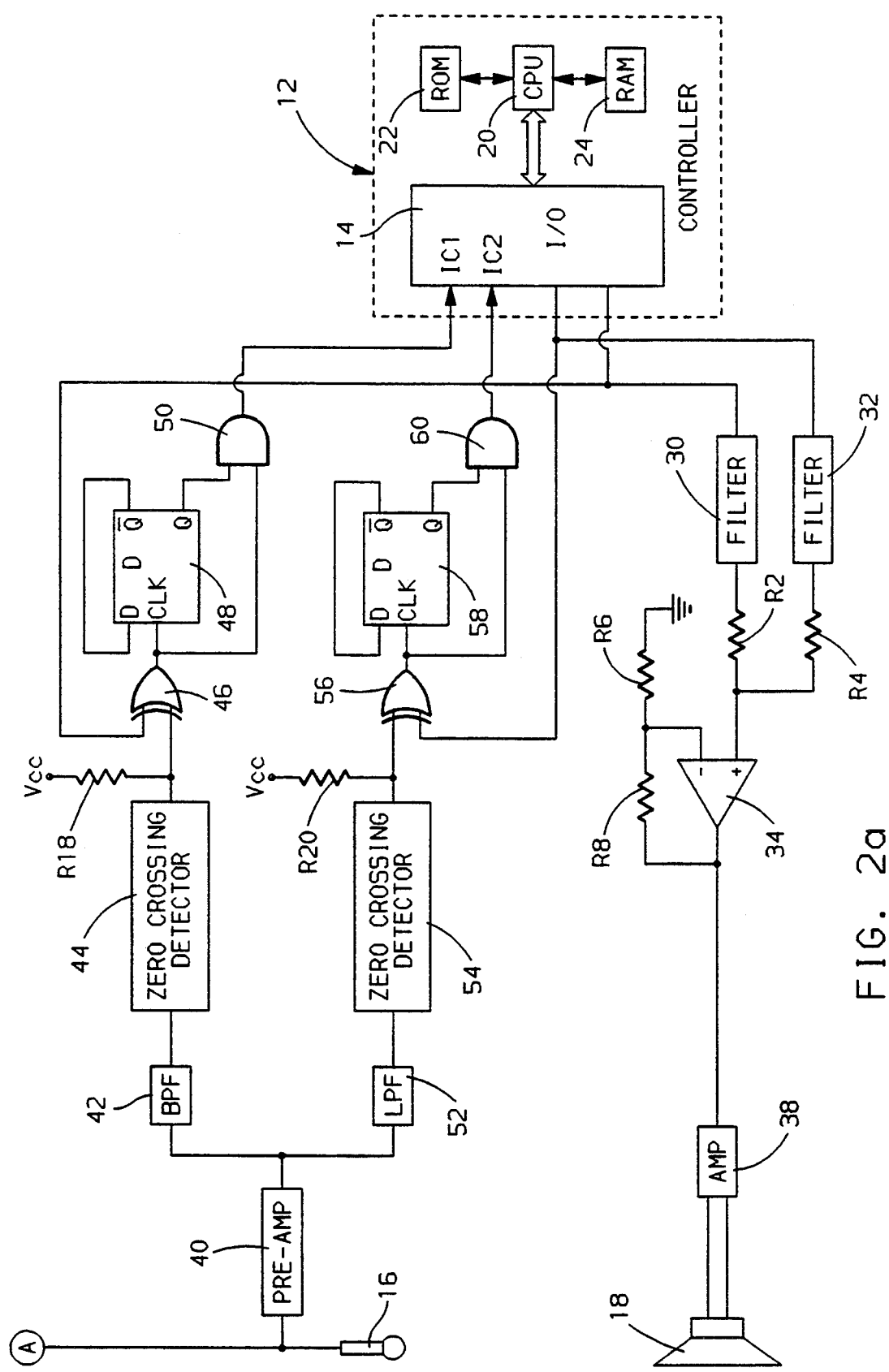
FIG. 2a is a diagram of the circuitry used to process acoustic signals used in accord with the preferred embodiment.

FIGS. 2a and 2b detail the circuitry of the signal processing circuit 8 of FIG. 1. Generally, controller 12 outputs two square wave pulsetrains, one at a calibrated first frequency and the other at a calibrated second frequency. These pulsetrains are used by a transmitter portion of the circuit of FIG. 2a to drive speaker 18, and by a receiver portion of the circuit to process the signal received by microphone 16.

In a critical part of this invention, the difference in phase between the transmitted and received signals at the two frequencies provides reliable information on vehicle interior volume. For instance, the phase shift of a closed vehicle with no occupants therein is, for certain frequencies in the acoustic range, significantly different than the phase shift for an open vehicle, such as a vehicle with any open doors or windows, or for a vehicle with occupants therein. By properly selecting, in a calibration step, a first frequency for a given vehicle as the frequency experiencing a measurable change in phase between a closed, empty state and an open or occupied state, such intrusions may be diagnosed in accord with this invention by periodically measuring phase shift in the vehicle when a vehicle security system is armed. The first frequency will likely be in the 20–50 Hertz range depending on the interior volume of the vehicle 10 (FIG. 1). In this embodiment, the first frequency is calibrated as 32 Hertz.

However, it has been determined that for certain frequencies having phase that is sensitive to intrusion, there are related sensitivities that may produce misleading diagnosis of intrusion. For instance, it has been determined that impacting the vehicle exterior, for example striking the vehicle exterior, may cause a change in phase similar to that experienced in a bona fide intrusion. In a critical part of this invention, such potential false alarm conditions may affirmatively be diagnosed by determining a second frequency sensitive to such conditions, and not sensitive to bona fide intrusion conditions. By monitoring phase shift in the above-described first frequency and in any such second frequency, the sensitivity of intrusion detection is preserved while providing false alarm detection. In this embodiment, the second frequency is 145 Hz. The second frequency will typically be in the 80–150 Hertz range.

Referring to FIG. 2a, a transmitter portion and a receiver portion are illustrated. The transmitter portion generally includes filters 30 and 32, summing amplifier 34, power amplifier 38 and speaker 18. First and second pulsetrain signals at the above-described first and second frequencies respectively, are output from controller 12, or from some peripheral device, such as a conventional pulse generating device, to respective filters 30 and 32. The filters are provided to introduce lag into the signals to make them suitable for driving the conventional speaker 18. It is generally understood in the art that substantially square wave pulsetrain signals, such as those output from controller 12 are not appropriate for driving speakers. Any conventional filter, such as simple lag filters capable of reducing the slope of the edges of the first and second pulsetrain signals may be used for this conditioning.

The filtered signals are next passed to a unity gain summing amplifier 34 including input resistors R2 and R4, feedback resistor R8, and pull-down resistor R6, all of which are set to ten kilo-ohms in this embodiment. As is well established in conventional circuit design, the output of summing amplifier 34 contains the frequency content of the first and second signals. This output signal is passed to a conventional power amplifier 38, such as any power amplifier capable of driving conventional speaker 18. The amplifier in this embodiment is SGS Thomsen TDA 7360. The amplifier 38 drives speaker 18 with a voltage proportional to the summing amplifier output.

The microphone 16 is positioned in the front of the vehicle 10, as described (FIG. 1), and transduces radiation generally in the acoustic range, such as that output from speaker 18, which is preferably positioned in the rear of the vehicle 10. The transduced signal is passed through a signal processing circuit including generally pre-amplifier 40, band pass filter 42, low pass filter 52, zero crossing detectors 44 and 54, exclusive-OR gates 46 and 56, D flip-flops 48 and 58, and AND gates 50 and 60. The circuit provides two output pulses the duration of each of which is proportional to the amount of detected phase shift at the first and second frequencies.

Specifically, the transduced signal is passed to a conventional pre-amplifier 40, which generally magnifies the amplitude of the transduced signal without frequency discrimination. The amplified signal is passed to two parallel paths the first starting with a band pass filter BPF 42 and the second starting with a low pass filter LPF 52. The BPF 42 may be a conventional second order filter tuned in accord with principles generally known in the art of circuit design to significantly attenuate frequencies above and below a pass band, which in this embodiment, is centered around the frequency of the second pulsetrain, described above as 145 Hz.

The BPF 42 output is passed to a conventional zero crossing detector 44. The detector 44 monitors the substantially sinusoidal BPF 42 output and delivers a high signal when the BPF output signal is above a reference, and delivers a low signal when the BPF output signal is below the reference. The reference in this embodiment is set at approximately 2.5 volts. Such detector 44 may be a simple op-amp in a comparator configuration, wherein the 2.5 volt reference voltage is applied to the inverting input and the BPF 42 output is applied to the non-inverting input.

The output of the zero crossing detector 44 then is a substantially square wave having the frequency of the signal passed by BPF 42. The square wave is pulled up through pull-up resistor R18, and is passed next to exclusive-OR gate 46, D flip-flop 48, and AND gate 50. These elements are provided to compare the phase between the transmitted signal and the received signal, at the second frequency. The three elements 46–50 generate an output pulse having duration proportional to the phase shift. The output pulse is provided to controller 12 once per second frequency period.

Specifically, the pulled-up zero crossing detector 44 output is input to a conventional two input exclusive-OR gate 46. The other input to the gate 46 is the second pulsetrain itself from controller 12. The exclusive-OR gate 46 output will switch between high and low voltage levels for every input edge to the gate 46. This results in a pulsetrain of twice the frequency of the second pulsetrain, wherein each positive pulse is of duration proportional to the change in phase between the transmitted and received signals.

The gate 46 output is provided as the clock input to D flip-flop 48. The flip-flop may be any conventional D type flip-flop that gates its input D through to its output Q for each rising edge of the clock input. In this embodiment, the inverted flip-flop output is fed back into the input D, such that on each rising edge of the clock input, the flip-flop 48 output will switch between digital voltage levels. This provides that only rising edges will be indicated and passed through to the next stage of the circuit as level changes. The flip-flop 48 output will be high for approximately half the period of the second pulsetrain, and low otherwise.

The flip-flop 48 output is passed to conventional two input AND gate 50. The second input is the output from exclusive-OR gate 46. Accordingly, only for about half the period of the second pulsetrain (when the flip-flop output is high) will any exclusive-OR gate 46 output pulse, representing the amount of phase shift at the second frequency, be gated through the AND gate 50. AND gate output is provided to a conventional input capture input IC1 of controller 12, via input/output I/O section 14. The input capture port is initialized to automatically generate a software interrupt when a rising or a falling edge is received at the port. When an interrupt occurs, a vector, which is preset in ROM 22, vectors controller attention to the routine illustrated in FIG. 4, to be described.

Returning to the output of pre-amplifier 40, beyond being provided to BPF 42, the output is provided to low pass filter LPF 52, as described. The LPF 52 may simply be a first order R-C filter, tuned to significantly attenuate frequencies above a calibrated cutoff frequency, such as approximately 50 Hz in this embodiment. Accordingly, the frequency content of the signal passed by the filter 52 is dominated by any low frequency signal received by microphone 16, such as the first frequency of 32 Hz.

Testing has indicated that, under the conditions this filtering will be active, the low frequency content of acoustic energy in the vehicle will almost entirely be comprised of the first frequency emitted by speaker 18. As such, a simple and inexpensive LPF 52 is adequate to pass only that first frequency, substantially unpolluted by other low frequency content. A material presence of low frequency noise in the vehicle when the filtering is active may warrant some other conventional filtering approach, such as second order band pass filtering. The inventors intend that such alternatives are within the scope of this invention, as any means of providing phase shift of the frequencies of interest to controller 12 would serve to carry out the principles of the invention in accord with FIG. 2a.

The substantially sinusoidal signal from the LPF 52, dominated by the first frequency, is next passed to a zero crossing detector 54, which squares the signal and retains its frequency in the manner described for detector 44. The squared signal is pulled up via pull-up resistor R20, and is passed to exclusive-OR gate 56, D flip-flop 58, and AND gate 60. In the manner described for the elements 46, 48, and 50 above, these three elements serve to provide a single pulse to controller 12 each period of the first frequency, wherein the duration of each pulse is proportional to the amount of phase shift in the first frequency.

The output of the three elements 56–60 is passed to a conventional input capture port IC2 of controller 12. The conventional input capture input automatically initiates an interrupt when either a rising or a falling edge is received at the port, to be described. The interrupt is serviced by the routine illustrated in FIG. 5.

It should be noted that there are many alternatives to providing phase shift information to controller 12 beyond the specific circuitry of FIG. 2a. The inventors do not intend that the specific circuitry of FIG. 2a be any more than a preferred embodiment of the phase determining and communicating means. For instance, a high performance processor, such as a conventional digital signal processor, may have the capacity to process data from the two zero crossing detectors 44 and 54 and determine phase shift without any further hardware.

Practical considerations, such as power supply limitations, provide incentive for not continuously executing the phase monitoring function of the circuit of FIG. 2a. Rather, the system at most should operate only when armed by the vehicle operator, such as automatically occurs when the vehicle doors are locked and the vehicle is exited.

Furthermore, once armed, the inventors have determined that a beneficial tradeoff between system power consumption and vehicle security can be provided by only periodically checking the vehicle for intrusion. The condition on which an armed system will proceed with a security check furthermore can be time-based or event-based. Specifically, the controller 12 may be put to sleep which, for present purposes, means power has been removed from the controller 12 when the vehicle is turned off and a security system incorporating the principles of this invention is armed. The controller is "woken up" by a hardware timer timing out, by a significant audible noise input to microphone 16, or by any of a number of conventional security conditions being manifest. Furthermore, the controller will wake up when the vehicle is "turned on."

The controller wake-up circuitry in accord with this embodiment is illustrated in FIG. 2b. Wake-up inputs 120 are provided to AND gate 96, the output of which is provided to a power supply module PSM 100 wherein the inputs are normally high, and are driven low when some wake-up condition occurs. Such wake-up conditions may include the vehicle operator rotating the vehicle ignition to its "on" position or a potential security violation, for instance as may be generally known in vehicle security art. Appropriate conventional hardware is provided on the vehicle such that when any one of the wake-up conditions is present, the corresponding input to AND gate 96 is low, driving the AND gate output low. The low AND gate 96 output is fed to PSM 100, activating the PSM. Inputs indicating a potential security violation may include inputs that are driven low when vehicle doors, hood, or trunk are opened, or are driven low when the vehicle is bumped or jarred, according to generally known vehicle security approaches.

When the PSM 100 receives a low signal from AND gate 96, it applies ignition power to controller 12, to activate the controller. The ignition power will remain on, once triggered by a security input, until the controller returns to sleep which, in this embodiment, is dictated by disable line 98 from controller 12 to PSM 100 being driven low as provided by software command. The PSM 100 may be a conventional regulated power supply, the power output of which may be switched on and off via the described control inputs.

However, controller activation need not come solely from a conventional wake-up input 120. Two other sources of activation are provided in this embodiment to accommodate the principles of this invention. First, a significant acoustic input to microphone 16 (FIG. 2a) can activate the controller 12, and second, a timeout can activate the controller.

Figure 3A:
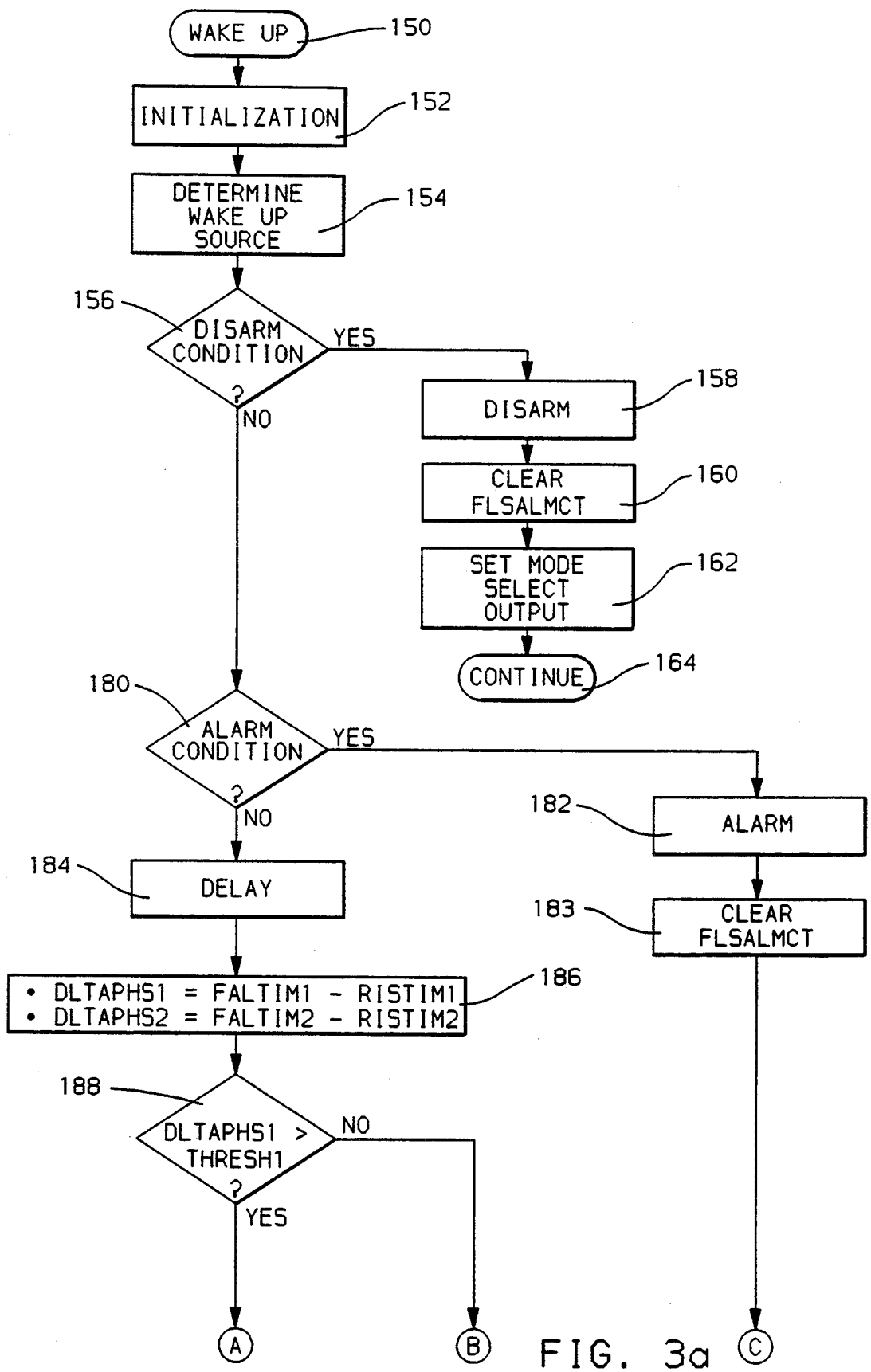
FIGS. 3a, 3b, 4 and 5 are computer flow diagrams illustrative of the steps used to carry out the principles of this invention in accord with the preferred embodiment.

While both or either of these wake-up sources may be active in alternative embodiments of this invention, the preferred embodiment allows the controller 12 to select one or the other as active at any time. For instance, it may be desirable to minimize system power requirements by not activating the controller unless a significant acoustic input is transduced by microphone 16. Alternatively, if significant acoustic inputs are frequent and are merely false alarms, it may be desirable to switch to a time-based wake-up approach in which the controller 12 wakes up when a timer expires to make security checks in accord with this invention. In this embodiment, the system, when armed, will attempt the acoustic input wake-up approach and, if necessary, will switch to the timeout approach. The steps used to carry out this aspect of the invention will be described in FIGS. 3a and 3b.

The controller decision on wake-up mode is manifest on controller output line 116, wherein a low output on line 116 is time-based wake-up mode "timer mode," and a high output is microphone event-based wake-up mode "microphone mode." Output line 116 is provided as the data D input to conventional D flip-flop 102. The clock CLK input to the flip-flop 102 is provided by controller output line 114, on which the controller sends a pulse before returning to sleep mode. The pulse acts to latch the D flip-flop data input through to the flip-flop output Q. The output is provided to conventional two input NAND gate 110, and is inverted via inverter 106 and provided as an input to conventional two input NAND gate 108.

The described controller output 114 is also provided as a trigger input to delay circuit 104. Accordingly, when the controller is returning to sleep mode, the pulse sent on line 114 starts a delay period of predetermined duration. For instance the delay circuit may include a conventional "one shot" which delays transmission of a high output signal a set amount of time after being triggered by an input pulse. In this embodiment, the delay circuit is set to delay transmission of the high output signal in the range of fifteen to thirty seconds. After the delay, a high delay circuit output signal is provided as an input to NAND gate 108, and the high signal is also provided as an input on line 118 to a controller port to indicate the source of any wake-up that may result from the high signal. Upon receiving the pulse, the controller may, at most, proceed with a security check in accord with the principles of this invention and, at least, may start another delay period by pulsing line 114, for instance if no security check is necessary at the time. When line 114 is pulsed, the delay circuit output is returned to its inactive low state.

NAND gate 108 will only output a low signal when inverter 106 output is high, indicating timer mode is active, and when delay circuit 104 output is high, indicating a timeout of the delay period. The low signal is communicated to AND gate 96 and, as described for the inputs 120, drives AND gate output low, activating the PSM to provide ignition power to the controller 12.

Alternatively, when in microphone mode, the timeout of delay circuit 104 will be blocked by NAND gate 108, so as to not activate PSM 100. However, a significant microphone signal will activate the PSM 100 in microphone mode. To determine when such a signal is present, microphone 16 (FIG. 2a) output at point A is provided through 10 kilo-ohm resistor R34 to the non-inverting input of comparator 112, to be compared to a threshold voltage level supplied to the inverting input of the comparator 112. The threshold voltage is set by adjusting variable resistor R32 so the voltage drop from the inverting input to ground is appropriate for the expected level of ambient noise the armed system will be subject to. For instance, measurement of the microphone output voltage under expected ambient noise conditions when the vehicle is off will evidence ambient microphone output.

The threshold voltage should be set an amount above that ambient output level, to avoid controller 12 wake-up from mere ambient noise. However, the threshold voltage should not be set so high that noise inputs consistent with intrusion inputs do not wake the controller 12. Factors such as microphone sensitivity, vehicle sound insulation, and microphone location in the vehicle contribute to the application specific nature of the calibration of the threshold voltage.

Returning to comparator 112, if the microphone output level exceeds the threshold voltage, the comparator output will be driven high. As is well-documented in the art, feedback resistor R30, and input resistor R34, are provided with comparator 112 to increase the speed of the output transition and to reduce the potential for multiple triggers, such as from a noisy input from the microphone 16. Both R30 and R34 are 10 kilo-ohms in this embodiment. The comparator output is provided as an input to NAND gate 110. Accordingly, if in microphone mode such that the output Q of latch 102 is high, and if a significant microphone input results in a high comparator 112 output, the output of NAND gate 110 will be driven low, activating PSM 100, waking up controller 12.

When the controller 12 wakes up, such as from a low AND gate 96 input to PSM 100, controller hardware such as RAM 24, and I/O 14 is initialized in a conventional manner. In this embodiment, the controller then focuses on the start-up software routine illustrated in FIGS. 3a and 3b, starting at step 150. The routine moves next to step 152, to carry out software initialization, such as by transferring data constants from ROM 22 locations to RAM 24 locations, assigning initial values to counters and pointers, and initializing flags. At this step two interrupts are enabled. The first, called an input capture 1 IC1 interrupt, is enabled to occur when a signal rising edge is received at port IC1 (FIG. 2a). An interrupt vector should be set in ROM 22 to direct controller 12 attention to an appropriate interrupt service routine when the IC1 interrupt OCCURS.

Figure 4:
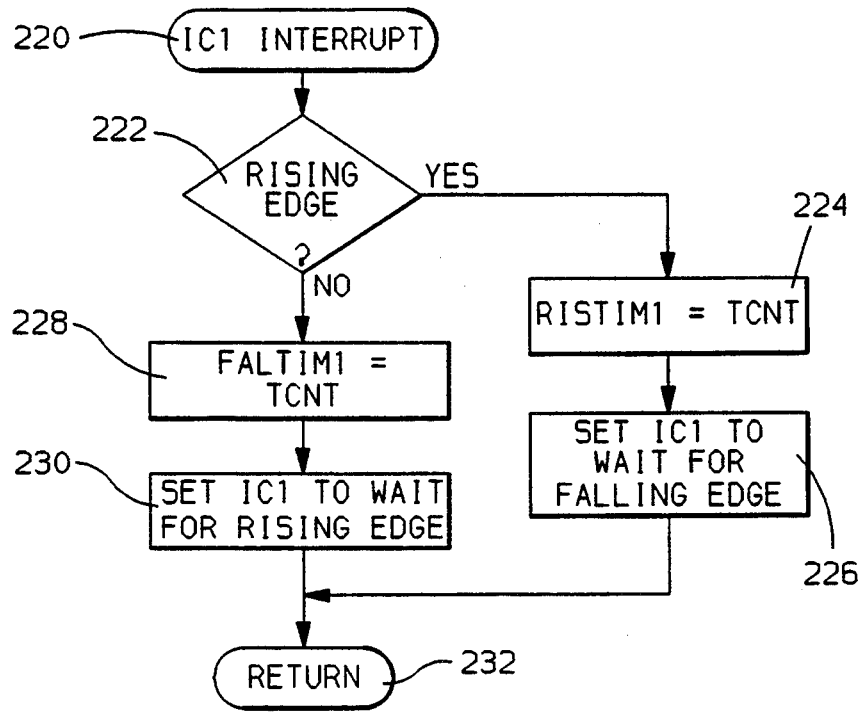
Figure 5:
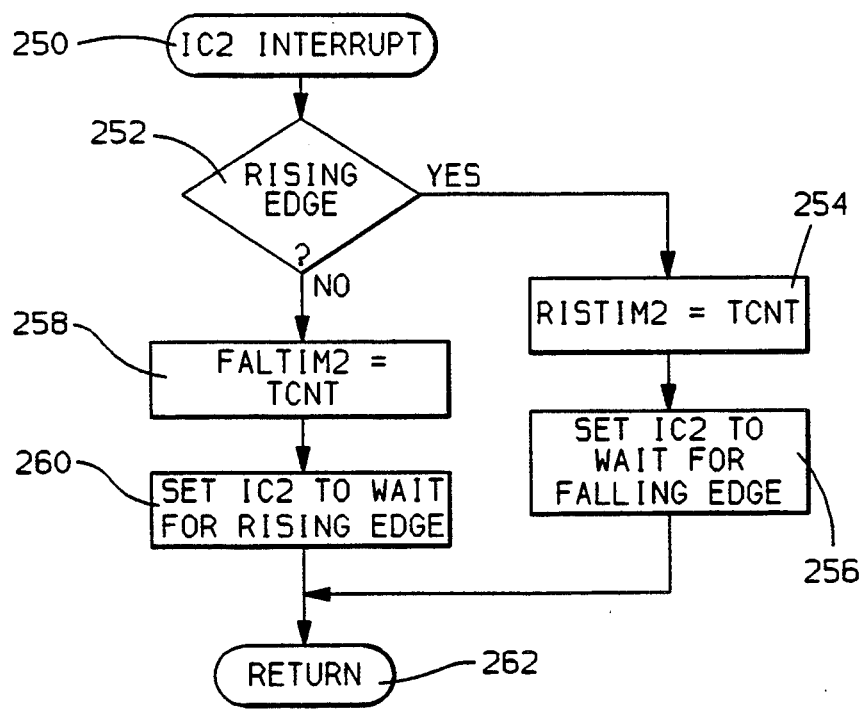

The IC1 service routine vectored to in this embodiment is illustrated in FIG. 4, to be described. The second interrupt, called an input capture 2 IC2 interrupt, is enabled to occur when a signal rising edge is received at port IC2 (FIG. 2a). The service routine vectored to upon the IC2 interrupt is illustrated in FIG. 5, to be described. An interrupt mask register in RAM 24 may be appropriately set to mask all but rising edge interrupts for IC1 and IC2. The initialization step further enables transmission of the described first and second pulsetrains from controller 12 to the circuit of FIG. 2a, as described. The transmission will continue until the controller 12 returns to sleep.

The routine next moves to step 154, to determine the wake-up source. By polling appropriate controller 12 ports, such as the port receiving the signal from line 118 (FIG. 2b), the controller at step 154 may determine whether the source was the opening of a door, trunk, or hood, rotation of the ignition cylinder, a microphone input, a timeout from delay circuit 104 (FIG. 2b), etc.

Once the wake-up source has been identified at step 154, the routine moves to step 156, to determine whether a disarm condition is present, such as an appropriate entry to or start-up of the vehicle. Such may be determined in accord with conventional practice, for instance when rotation of the ignition cylinder is detected a brief amount of time after the vehicle doors are opened. If a conventional disarm condition is present at step 156, the routine moves to step 158, to disarm the security system until the next arming sequence, such as when the vehicle doors are closed and locked for a predetermined period of time while the vehicle is disabled, as is generally known in vehicle security art. The disarm condition ensures that the vehicle may be started, for instance by providing a current source to the vehicle starter (not shown), and disables any alarm that may otherwise be enabled.

After disarming the security system at step 158, the routine moves to step 160, to clear a false alarm counter FLSALMCT, to be described. The routine then advances to step 162, to set mode select output 116 (FIG. 2b) to a high level, to activate microphone mode, as described. Accordingly, when the security system of this embodiment is again armed, microphone mode will be active until conditions warrant timer mode to be active, as will be described. After activating microphone mode at step 162, the routine moves to step 164, to continue with any steps required to carry out any further controller operations in accord with general vehicle control. For instance, the controller 12 may be used to control vehicle processes other than security processes when the vehicle is operating. At step 164, any such conventional routines may begin.

Returning to step 156, if a disarm condition is not present, the routine moves to step 180, to determine if an alarm condition is present. For instance, such a condition may be based on the type of input that activated the PSM 100 (FIG. 2b). An input indicating the door, trunk, or hood is open without a subsequent rotation of the ignition cylinder (not shown), or indicating the vehicle has been bumped or jarred may constitute an alarm condition at step 180. In such a case, the routine moves to step 182 to activate an alarm in a manner consistent with generally known vehicle security practice. Any known alarm approach, such as opening a current supply line to the vehicle starter (not shown) while flashing vehicle lights and honking vehicle horn (not shown) for a period of time may be used to indicate the security violation.

After activating the alarm at step 182, the routine moves to step 183 to clear FLSALMCT, a counter indicating the number of false alarms since the last true alarm or since the last time the system was disarmed. Next, the routine returns to step 194, to issue a pulse on line 114 (FIG. 2b), which may wake up the controller 12 after the described predetermined period of time. The routine then proceeds to step 196, to prepare for a return to sleep mode, wherein the controller 12 wraps up its present operations, such as storing critical RAM 24 information in non-volatile RAM (not shown). The routine then at step 197, directs the controller 12 to self-deactivate by transmitting a signal on line 98 (FIG. 2b) to de-activate power supply module PSM 100.

Returning to step 180, if an alarm condition is not determined to be present, the routine moves to step 184, to delay a predetermined period of time before proceeding with further steps of the routine. This delay is appropriate to accommodate the significant lag time in the hardware of FIG. 2a. For instance, when the controller 12 wakes up, it will, as described in the text corresponding to step 152, start transmitting the above-described first and second pulsetrains to the circuit of FIG. 2a. The frequency information from the pulsetrains must be filtered, summed and amplified before reaching speaker 18, must propagate through the vehicle before being received by microphone 16, and then must be filtered and conditioned before any phase shift information is provided to the controller 12. The significant time lag involved in this process before informational phase shift data is received at controller 12 is compensated by delaying at step 184 until it may be assumed that the input capture ports have reliable phase shift information.

During the delay period of step 184, higher priority interrupts may occur to service the phase shift information received at the input capture ports of the controller 12. The information stored on the most recent occurrences of these interrupts is used by the routine of FIGS. 3a and 3b, and old information is written over by those routines. Accordingly, when the delay at step 184 is complete, reliable information on phase shift has been stored. The routine of FIG. 3a then proceeds to use the stored information at step 186, where phase change of the first frequency DLTAPHS1 and phase change of the second frequency DLTAPHS2 are calculated as the difference in time that edges are received at controller 12. As described in FIG. 2, one rising and one falling edge will be received at the input capture inputs of controller 12 for each period of the first and second frequencies, and the duration of the positive pulse defined by those edges is proportional to phase shift. By simply calculating the difference between the time the rising edge is received at the controller 12 and the time the adjacent falling edge is received at the controller, a value proportional to phase shift is made available.

Figure 3B:
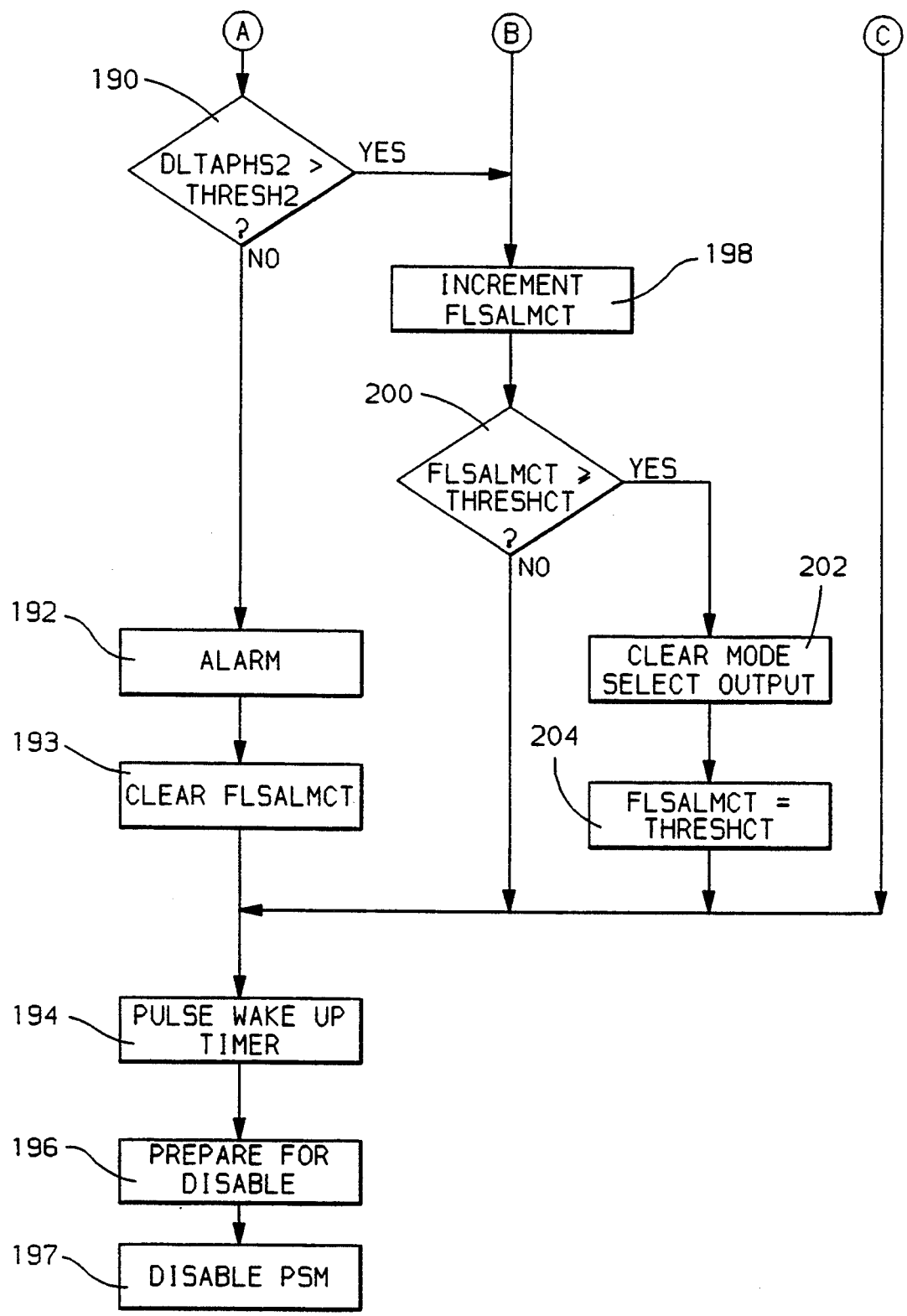

Returning to FIG. 3a, after calculating DLTAPHS1 and DLTAPHS2 at step 186, the routine advances to step 188, to compare DLTAPHS1 to a calibrated threshold phase shift value THRESH1, indicating the maximum amount of phase change that will be assumed to not indicate an intrusion. THRESH1 may be calibrated by monitoring change in phase of the first frequency for the given vehicle over a variety of intrusion scenarios, such as open or broken window, open door, etc., and determining the minimum amount of phase shift that corresponds to an intrusion. If, at step 188, DLTAPHS1 exceeds THRESH1, an intrusion may have occurred, and the routine proceeds to false alarm detection starting at step 190 (FIG. 3b).

As described, the second frequency is calibrated as one in which no significant phase shift occurs upon intrusion, but a significant shift occurs when the vehicle is bumped or jarred, for instance by striking the exterior of the vehicle. Such a condition can affect the phase shift of the first frequency so as to appear as an intrusion. By monitoring both the first and second frequencies intrusions may be detected with significantly reduced risk of false alarms.

Specifically then, the routine compares DLTAPHS2 to THRESH2 at step 190. THRESH2 is calibrated in the manner described for calibration of THRESH1, wherein measurement of phase shift of the second frequency while the condition of interest is effective, such as while the exterior of the vehicle is being bumped or jarred, indicates an amount of phase shift corresponding to the condition. THRESH2 should be set to the minimum phase shift in the selected second frequency that can be attributed to the false alarm condition for the vehicle. If DLTAPHS2 does not exceed THRESH2 at step 190, it is assumed the condition that caused the significant phase shift in the first frequency was not a false alarm condition, and therefore was a bona fide intrusion. The routine then proceeds to step 192 to activate any conventional alarm that may be available on the vehicle, such as the alarm outlined at step 182. The routine next clears FLSALMCT at step 193.

Alternatively, if at step 190 the false alarm condition is determined to be present, or returning to step 188, if there was no significant phase shift in the first frequency, an intrusion is assumed to not have occurred, and the routine moves to step 198 (FIG. 3b), to increment a false alarm counter FLSALMCT, stored in non-volatile RAM, to indicate that the system woke up from some false alarm condition. The routine next moves to step 200 to compare FLSALMCT to THRESHCT, a counter threshold value indicating the tolerance of the system to false alarms. If FLSALMCT exceeds or is equal to THRESHCT, the routine moves to step 202, to clear mode select output 116 (FIG. 2b) to switch from microphone mode to timer mode.

A significant number of false alarms between true alarms or between disarms of the system, for instance from a driver disarm command, indicates a significant strain on the vehicle power supply, and therefore that microphone mode may be undesirable. For example, if the vehicle is armed in microphone mode in a location having a significant level of ambient noise, the system will likely be frequently waking up and checking for intrusion with no material gain in vehicle security. Such conditions are assumed to be more appropriate for timer mode where, as described, the vehicle wakes up after a period of time without regard to ambient noise inputs.

This approach to switching from microphone mode to timer mode was selected in this embodiment for its simplicity. However, the inventors feel there are a variety of approaches within the scope of this invention that accommodate the change in modes. For instance, by monitoring the time rate of false alarms (the number of false alarms over a period of time), or by directly monitoring the ambient noise once the vehicle is armed and adjusting the threshold voltage at the inverting input to comparator 112 (FIG. 2b) so the ambient noise does not disturb the controller 12, microphone mode may be avoided when its benefit is reduced.

Returning to step 202, after switching to timer mode, the routine proceeds to step 204 to limit FLSALMCT to THRESHCT, to avoid counter overflow. Next, or if FLSALMCT did not exceed THRESHCT at step 200, the routine moves to steps 194 through 197, as described.

As described at step 152 (FIG. 3a), controller initialization upon wake-up includes setting input capture ports IC1 and IC2 to interrupt controller operations when a rising edge is received at either port. These interrupt are assigned a higher priority than that invoking the routine illustrated in FIG. 3a, such that when IC1 or IC2 interrupts occur, FIG. 3a operations will be halted, the interrupt will be fully serviced, and then the routine of FIG. 3a may resume at the point it left off. Such operation prioritization is generally understood in the art. The routine to service the IC1 interrupt is illustrated in FIG. 4, and is entered at step 220. Generally, this interrupt stores alternating rising and falling edge occurrence times in RAM for use in determining phase shift of the first frequency.

The routine first proceeds to step 222, to determine, such as from the interrupt mask word in RAM 24 (FIG. 2a) whether the present interrupt resulted from a rising edge or a falling edge received at the IC1 port (FIG. 2a). If from a rising edge, the routine advances to step 224, to store the present controller 12 clock value TCNT in RAM under the name RISTIM1. The routine then moves to step 226, to switch the interrupt mask flag in RAM 24 to allow interrupts only on falling edges received at port IC1. The routine then returns to pre-interrupt operations, such as in the routine of FIG. 3a or 3b, via step 232.

Returning to step 222, if the interrupt was triggered by a falling edge received at port IC1, the routine proceeds to step 228, to store the present controller clock count TCNT, as representative of the time of the falling edge interrupt, in RAM 24 (FIG. 2a) under name FALTIM1. The routine then moves to step 230 to switch the interrupt mask flag in RAM 24 to allow interrupts only on rising edges received at port IC1. The routine then returns, via step 232, as discussed.

The interrupt generated by an edge received at controller port IC2 vectors controller attention to the routine of FIG. 5. Generally, this routine carries out the function of the routine of FIG. 4, but applied to the second frequency. The most recent rising edge time and falling edge time are stored in RAM 24 for use in determining phase shift by the routine of FIGS. 3a and 3b, as described. Specifically, the routine, when entered on an IC2 interrupt at step 250, proceeds to step 252 to determine whether a rising edge interrupt occurred. If so, the routine moves to step 254, to store TCNT in RAM 24 under variable name RISTIM2. The routine then proceeds to step 256, to set the interrupt mask flag in RAM 24 to allow interrupts only on falling edges received at port IC2. Next, the routine returns to controller operation prior to the IC2 interrupt, via step 262.

Returning to step 252, if the interrupt was from a falling edge at port IC2, the routine moves to step 258, to store TCNT in RAM 24 under variable name FALTIM2. The routine then moves to step 260, to set the interrupt mask flag to only allow interrupts on rising edges at port IC2. The routine then moves to step 262, to return to prior operations.

The description of a preferred embodiment for the purpose of illustrating the invention is not to be taken as limiting or restricting the invention since many modifications may be made through the exercise of skill in the art without departing from the scope of the invention.

The embodiments of the invention in which a property or privilege is claimed are described as follows:

1. A system for detecting intrusion into a vehicle interior, comprising:
   a signal transmitter for transmitting a first periodic signal having a first predetermined frequency in the vehicle interior;
   a signal receiver for receiving the first periodic signal in the vehicle interior;
   means for determining a first phase shift between the transmitted and received first periodic signals;
   means for comparing the first phase shift to a first predetermined shift threshold;
   a signal transmitter for transmitting a second periodic signal having a second predetermined frequency in the vehicle interior;
   a second signal receiver for receiving the second periodic signal in the vehicle interior;
   means for determining a second phase shift between the transmitted and received second periodic siqnals;
   means for comparing the second phase shift to a second predetermined shift threshold; and
   means for detecting an intrusion into the vehicle interior when the first phase shift exceeds the first predetermined shift threshold and when the second phase shift does not exceed the second predetermined shift threshold.

2. The system of claim 1, wherein the second predetermined frequency is a frequency that, when transmitted in the vehicle interior, undergoes a substantial phase shift upon an occurrence of a predetermined false alarm condition.

3. The system of claim 1, wherein the first predetermined frequency and second predetermined frequency are in the acoustic frequency range.

4. An apparatus for detecting intrusion into the interior of an automotive vehicle, comprising:
   a signal transmitter for transmitting a first periodic signal having a first predetermined frequency and for transmitting a second periodic signal having a second predetermined frequency;

a signal receiver for receiving the first periodic signal and the second periodic signal;

means for determining a first phase difference between the transmitted and received first periodic signals;

means for determining a second phase difference between the transmitted and received second periodic signals;

means for comparing the first phase difference to a first difference threshold;

means for comparing the second phase difference to a second difference threshold; and means for detecting intrusion into the interior of the vehicle when the first phase difference exceeds the first difference threshold and the second phase difference does not exceed the second phase difference threshold.

5. The apparatus of claim 4, wherein the first and second predetermined frequencies are in the acoustic frequency range.

6. The apparatus of claim 4, wherein the second predetermined frequency is a frequency that, when transmitted in the interior of the vehicle, undergoes a substantial phase shift when a predetermined false alarm condition is present.

7. A method for detecting intrusion into an automotive vehicle interior, comprising the steps of:

transmitting a first signal at a first predetermined frequency in the vehicle interior;

receiving the transmitted first signal in the vehicle interior;

measuring a first difference in phase between the transmitted first signal and the received first signal;

comparing the first difference in phase to a first phase difference threshold;

transmitting a second signal at a second predetermined frequency in the vehicle interior;

receiving the transmitted second signal in the vehicle interior;

measuring a second difference in phase between the transmitted second signal and the received second signal;

comparing the second difference in phase to a second phase difference threshold; and detecting intrusion into the automotive vehicle interior when the first difference in phase exceeds the first phase difference threshold and the second difference in phase does not exceed the second phase difference threshold.

8. The method of claim 7, wherein the first transmitted signal and second transmitted signal are airborne acoustic signals.

9. The method of claim 7, wherein the second predetermined frequency is a frequency that, when transmitted in the vehicle interior, undergoes a substantial phase shift upon the occurrence of a predetermined false alarm condition.

* * * * *